May 25, 1948.  S. DI PASQUALE  2,441,994

BROILER

Filed April 23, 1946

INVENTOR.
SALVATORE DI PASQUALE
BY
William F. Nickel
ATTORNEY

Patented May 25, 1948

2,441,994

UNITED STATES PATENT OFFICE 2,441,994

BROILER

Salvatore Di Pasquale, New York, N. Y.

Application April 23, 1946, Serial No. 664,237

2 Claims. (Cl. 126—275)

This invention relates to improvements in broilers or grills for the cooking of food; and particularly to a unit of this kind adapted to be operated in connection with any type of portable or permanently installed heater.

An object of the invention is to provide a broiler or grilling device capable of being readily handled and inexpensive to produce, also quite simple in its construction.

The character and advantages of the invention are made clear in the following description taken with the accompanying drawings; whereon Figure 1 is a perspective view of a grill or broiler according to this invention;

Figure 1:
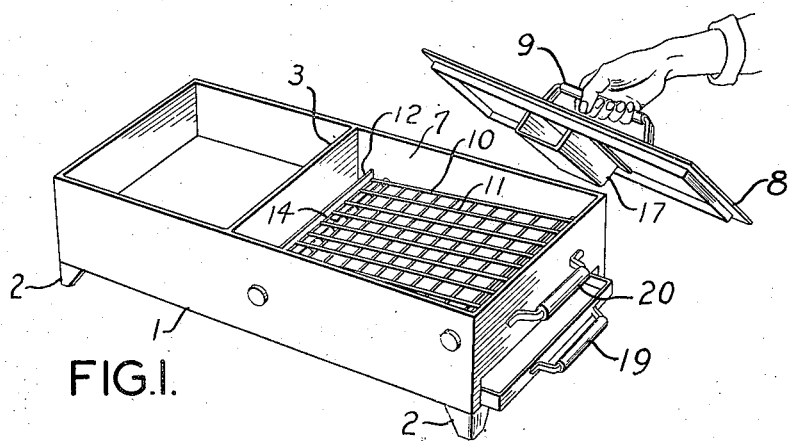
Figure 2:
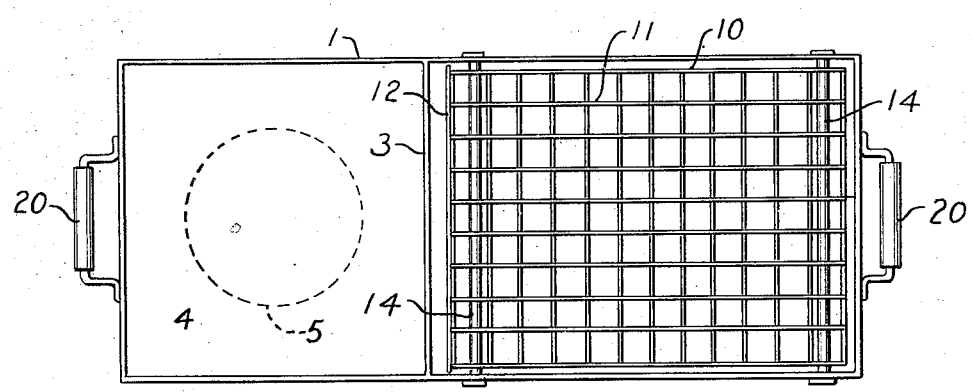
Figure 2 is a top view.
Figure 3:
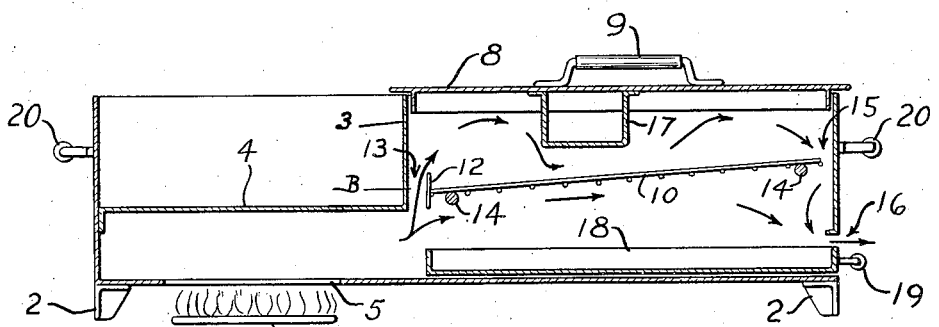
Figure 3 is a vertical longitudinal section.

The grill comprises a casing 1 of greater length than breadth and of the required height supported by legs or feet 2. Adjacent one end it contains a transverse vertical partition 3, extending from top downward but terminating above the bottom, and united at its lower edge to one edge of a horizontal partition or false bottom 4. The two partitions with the adjacent end and portions of the sides of the casing enclose a space which may be covered by the top of the grill, or be left open to receive dishes to be kept warm, if desired; and just under the bottom 4 is an inlet opening 5 for heat. The grill is set up with the hole 5 over a heater which may be the burner of a gas or oil heater of conventional make.

From the partition 3 to the other end the casing 1 has an elongated opening 7 in the top, to be closed by a cover 8 having a handle 9. Below the cover is a supporting element 10, which may have the form of a frame filled with wire mesh 11. This frame extends over substantially the entire space from the partition 3 to the far end of the casing, and adjacent the partition it carries on its end a vertical baffle plate 12 extending over its full width. The frame is approximately level with the bottom 4. Between this baffle plate 12 and the partition 3 is an open space B.

The frame 10 rests upon transverse bars 14 in the casing affixed to the sides thereof at their ends; and the extremity of the frame 10 remote from the baffle 12 is separated from the adjacent end of the casing by a space 15, just above an outlet opening 16 in said extremity. This opening 16 permits the hot products of combustion to escape. The distance of the frame 10 below the cover 8 is reduced by a transverse channel shaped metal member 17 on the inner face of the cover 8, and extending across the full width thereof; and this member acts as a baffle plate under which the heated air flowing through the broiler passes close to the frame 10.

The outlet 16 permits the insertion and withdrawal of a tray or drawer 18 having a handle 19. This tray catches any liquid that drips from meat or anything else on the grill frame 10 and facilitates cleaning out the interior of the casing. The tray leaves enough of the opening 16 unobstructed to enable this opening to serve its purpose. The casing 1 has handles 20 at the ends so that it can be lifted and moved about.

In practice, chops, steaks, potatoes, etc., are laid on the frame after the casing has been set upon a stove or heater with the hole 5 over the source of heat 6. The hot air flows against the plate 12, and then in great part over the frame, down through the mesh 11 and space 15 and out through the opening 16. Much of the hot air also comes into contact with the frame 10 from below and the viands are done nicely on both upper and lower sides. When the cooking is finished the cover 9 is lifted and the articles are removed. Juices and fats are caught by the tray 18. The frame can be taken out at any time, cleaned, and replaced.

The broiler is thus exceedingly useful and easy to make and use. The construction set forth is of course illustrative only and many changes in details can be incorporated if desired.

Having described my invention, what I believe to be new is:

1. A grill comprising a casing having a bottom and sides and ends around the bottom, a vertical transverse partition and a horizontal partition connecting the vertical partition to one end of the casing, the horizontal partition forming a false bottom above the first-named bottom, the latter having a heat-inlet opening below the false bottom, the space below the false bottom communicating with the space between the vertical partition and the opposite end, said last-named space being open at the top, a substantially horizontal grill frame supported in said last-named space, and a cover for said last named space having a baffle member on its lower face substantially parallel to said vertical partition.

2. The grill according to claim 1, wherein said casing has an elongated opening below said frame, in said opposite end.

SALVATORE DI PASQUALE.

REFERENCES CITED

The following references are of record in the file of this patent:

UNITED STATES PATENTS

| Number | Name | Date |
|---|---|---|
| 745,451 | Miller | Dec. 1, 1903 |
| 1,051,503 | Klein | Jan. 28, 1913 |
| 1,511,078 | Hornbostel | Oct. 7, 1924 |